(12) United States Patent
Ahn et al.

(10) Patent No.: US 9,362,543 B2
(45) Date of Patent: Jun. 7, 2016

(54) BATTERY PACK

(71) Applicant: Samsung SDI Co., Ltd., Yongin, Gyeonggi-do (KR)

(72) Inventors: Byungkook Ahn, Yongin (KR); Daeyon Moon, Yongin (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 113 days.

(21) Appl. No.: 13/743,628

(22) Filed: Jan. 17, 2013

(65) Prior Publication Data

US 2013/0244060 A1 Sep. 19, 2013

(30) Foreign Application Priority Data

Mar. 15, 2012 (KR) .......................... 10-2012-0026739

(51) Int. Cl.
*H01M 2/20* (2006.01)

(52) U.S. Cl.
CPC .............. *H01M 2/202* (2013.01); *H01M 2/204* (2013.01); *H01M 2/206* (2013.01); *H01M 2200/00* (2013.01)

(58) Field of Classification Search
CPC ........... H01M 2/20; H01M 2/22; H01M 2/10; H01M 2/30; H01M 2/34; H01M 2/202; H01M 2/204; H01M 2/206
USPC ...................................................... 429/161, 7
See application file for complete search history.

(56) References Cited

U.S. PATENT DOCUMENTS

| | | | | |
|---|---|---|---|---|
| 5,977,746 A | * | 11/1999 | Hershberger et al. | 320/112 |
| 6,098,420 A | * | 8/2000 | Furukawa et al. | 62/484 |
| 8,440,344 B2 | * | 5/2013 | Ahn | 429/161 |
| 8,709,622 B2 | * | 4/2014 | Jang et al. | 429/7 |
| 2005/0122700 A1 | * | 6/2005 | Kim et al. | 361/795 |
| 2005/0190531 A1 | * | 9/2005 | Gall et al. | 361/600 |
| 2005/0250006 A1 | | 11/2005 | Kim | |
| 2008/0008910 A1 | * | 1/2008 | Koh | 429/7 |

(Continued)

FOREIGN PATENT DOCUMENTS

| | | |
|---|---|---|
| CN | 1694294 | 11/2005 |
| CN | 101465413 | 6/2009 |

(Continued)

OTHER PUBLICATIONS

Office Action in Chinese Application No. 201310083054.4, issued Mar. 16, 2016.

*Primary Examiner* — Nicholas P D'Aniello
(74) *Attorney, Agent, or Firm* — Knobbe Martens Olson & Bear LLP

(57) ABSTRACT

Disclosed is a battery pack that makes it possible to decrease a lead time of an insulating tape attaching process, and re-attach an insulating member. The battery pack includes a plurality of battery cells, a protection circuit module that controls charging and discharging of the battery cells, a first connecting plate electrically connecting the battery cells to each other, a second connecting plate electrically connected to the first connecting plate, and bent from the first connecting plate; and an insulating member disposed between the battery cell and the first and second connecting plates. The insulating member includes a first region placed between neighboring ones of the battery cells, and a plurality of second regions that are bent from the first region and are placed on outer surfaces of the neighboring battery cells, respectively.

20 Claims, 4 Drawing Sheets

(56) References Cited

U.S. PATENT DOCUMENTS

| | | |
|---|---|---|
| 2009/0154048 A1* | 6/2009 | Jang et al. ............... 361/106 |
| 2010/0086841 A1 | 4/2010 | Moon |
| 2011/0104519 A1* | 5/2011 | Ahn ............................ 429/7 |
| 2011/0151285 A1 | 6/2011 | Hong et al. |
| 2011/0177382 A1 | 7/2011 | Kim |
| 2012/0247807 A1* | 10/2012 | Hanawa et al. ......... 174/110 SR |
| 2013/0034750 A1* | 2/2013 | Choi et al. ..................... 429/7 |

FOREIGN PATENT DOCUMENTS

| | | |
|---|---|---|
| KR | 10-2006-0019767 | 3/2006 |
| KR | 10-2010-0039748 | 4/2010 |
| KR | 10-2011-0047636 | 5/2011 |

* cited by examiner

BATTERY PACK

CROSS-REFERENCE TO RELATED APPLICATIONS

This application claims priority to and the benefit of Korean Patent Application No. 10-2012-0026739, filed on Mar. 15, 2012 and entitled, "BATTERY PACK" in the Korean Intellectual Property Office, the entire contents of which are incorporated by reference.

BACKGROUND

1. Field

Embodiments relate to a battery pack.

2. Description of the Related Technology

In general, a secondary battery is formed by putting electrolyte and an electrode assembly in a case, and sealing an opening of the case with a cap assembly including electrode terminals. The electrode assembly includes a positive electrode plate, a negative electrode plate, and a separator as an insulator therebetween.

According to the types of devices employing a secondary battery, a unit cell (e.g., a single bare cell) as a secondary battery, or a single pack including unit cells may be used. When a single pack including unit cells is used, the unit cells may be connected to each other in series and/or in parallel through a conductive plate. However, in certain cases, the electrical connection between the conductive plate and the unit cells may be disrupted if the conductive plate and the unit cells move out of physical contact with one another.

SUMMARY

In some current battery pack designs, the conductive plate that electrically connects the battery unit cells includes: a connecting plate connected to the unit cells; and a wire welding region bent from the connecting plate to provide a space to which a power wire or a voltage sensing wire is welded.

Before the conductive plate is welded to the unit cells, an insulating tape is attached thereto. The connecting plate of the conductive plate over the insulating tape is welded to the unit cells, and is electrically connected thereto. The wire welding region is perpendicularly bent together with the insulating tape, and then, the power wire or the voltage sensing wire is welded thereto. In this case, the bent conductive plate may be raised up by spring back of the bent insulating tape.

An embodiment of the present disclosure provides a battery pack that makes it possible to decrease a lead time of an insulating tape attaching process, and re-attach an insulating member.

Another embodiment of the present disclosure provides a battery pack that may inhibit contact failure between a battery cell and a connecting plate.

According to at least one embodiment, a battery pack includes: a plurality of battery cells; a protection circuit module that controls charging and discharging of the battery cells; a first connecting plate electrically connecting the battery cells to each other; a second connecting plate electrically connected to the first connecting plate, and bent from the first connecting plate; and an insulating member disposed between the battery cell and the first and second connecting plates. The insulating member includes: a first region placed between neighboring ones of the battery cells; and a plurality of second regions that are bent from the first region and are placed on outer surfaces of the neighboring battery cells, respectively.

The first and second regions may be bent along first lines, and a plurality of recesses or notches may be arrayed in the first line.

The insulating member may include a plate fixing region extending along the second region.

The second region may include a plurality of recesses or notches arrayed along a second line formed in the plate fixing region.

The second line may extend along an end of the first region.

The second line may include a cut line formed by cutting a portion of the second line from an end of the first region to an inner portion of the second region.

The plate fixing region may be placed on at least one portion of the first and second connecting plates.

The insulating member may include an adhesive layer on a surface thereof.

The second connecting plate may include: a connecting part electrically connected to the first connecting plate; a bent part perpendicularly bent from the connecting part; and an extension part extending from the bent part.

The second connecting plate may include a flexible printed circuit board (FPCB) or coverlay that includes a plurality of conductive patterns and an insulating layer enveloping the conductive patterns.

The second connecting plate may include an attachment part formed by removing a portion of the insulating layer, and a connecting member may be fixed to the attachment part through welding.

The connecting member may be electrically connected to the protection circuit module.

The first connecting plate and the second connecting plate may be integrally formed as a single body.

The insulating member may include a plurality of notches arrayed along a first line between the first region and the second region.

The insulating member may include a plurality of through holes arrayed along a first line between the first region and the second region.

In another embodiment, a battery pack is provided. The battery pack comprises a plurality of battery cells having a first side and a second side. The battery pack further comprises an electrically conductive element in contact with the plurality of battery cells. The battery pack additionally comprises an insulating member having a first region and a second region. The first region is interposed between the electrically conductive element and respective first sides of two adjacent battery cells. The second region is positioned adjacent to respective second sides of the two adjacent battery cells and urges the electrically conductive element into contact with the plurality of battery cells.

The battery pack may further include a protection circuit module that controls charging and discharging of the battery cells.

The plurality of battery cells may be cylindrical. The first side of a battery cell may be a sidewall of the cylinder and the second side of a battery cell may be an end of the cylinder.

The insulating member may comprise an insulating layer and an adhesive layer.

The battery pack may further comprise a connecting member having an end connected to the electrically conductive element. The connection member may be selected from flexible printed circuit boards and coverlays.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
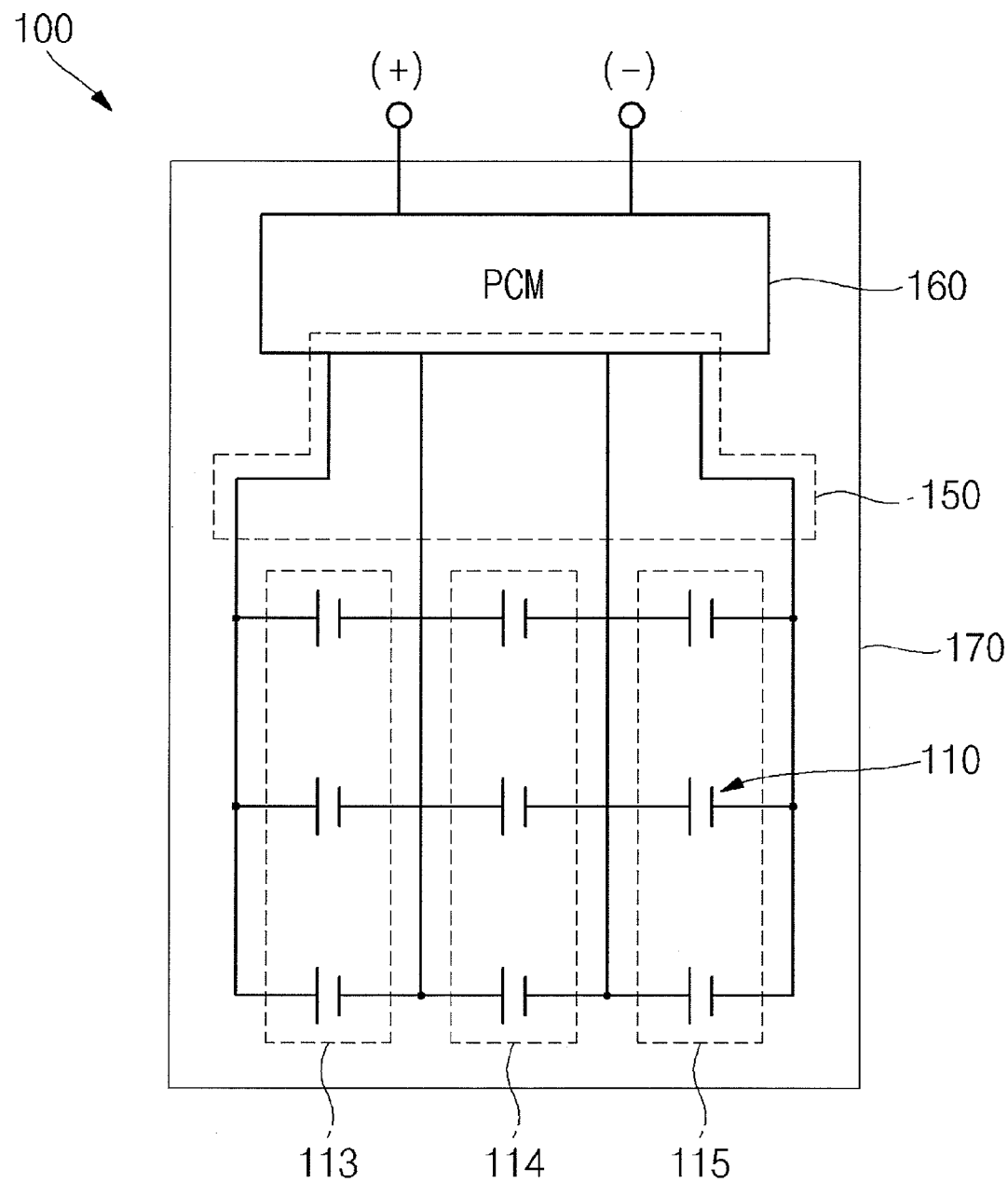
FIG. 1 is a circuit diagram illustrating a battery pack according to an embodiment.
Figure 2:
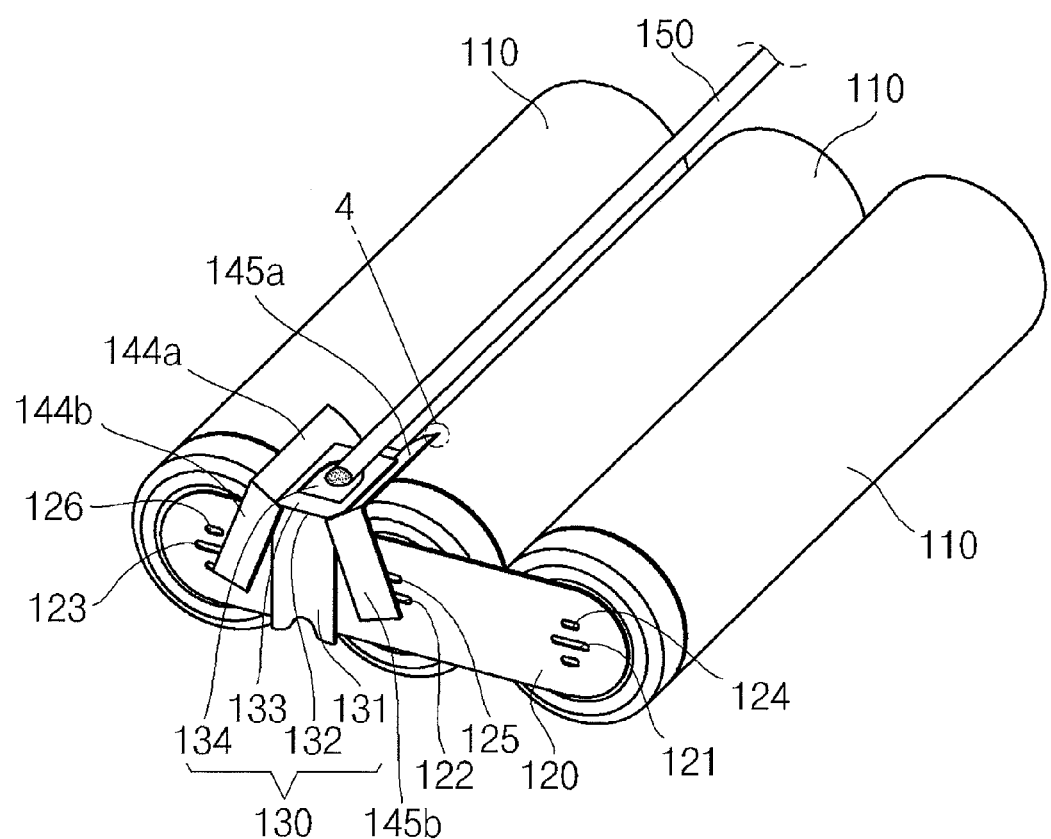
FIG. 2 is a perspective view illustrating a state where a first bank of FIG. 1 is connected to a conductive plate.
Figure 3:
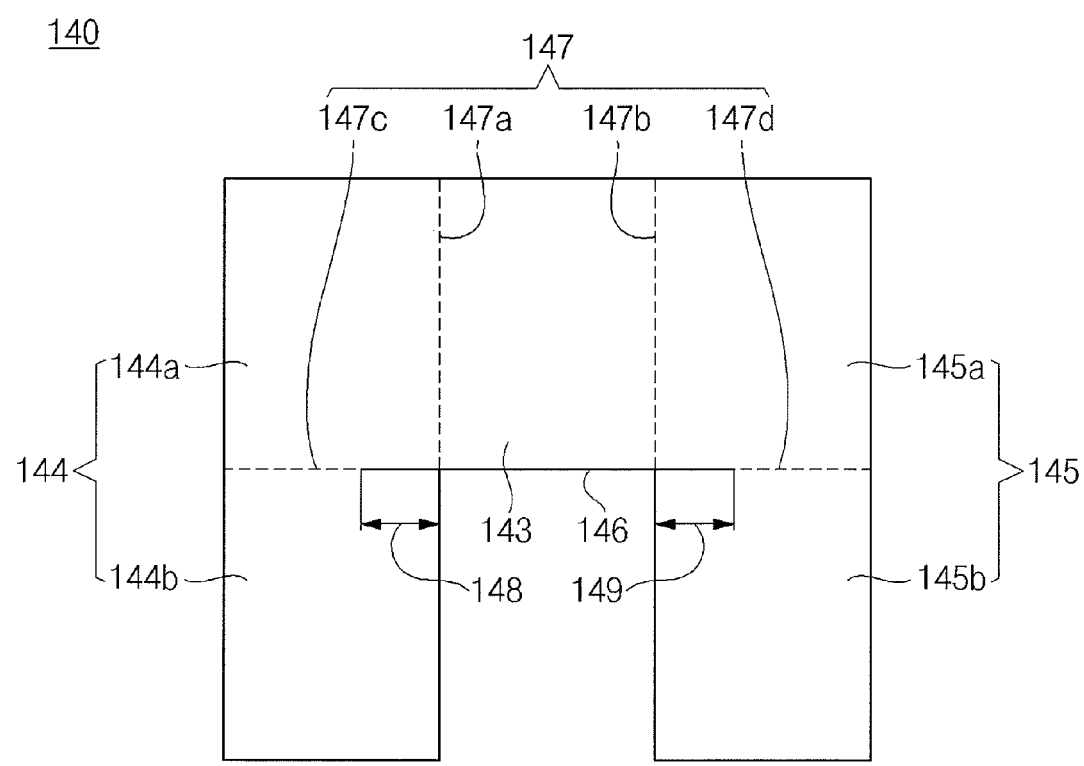
FIG. 3 is a plan view illustrating an insulating tape of FIG. 2.
Figure 4:
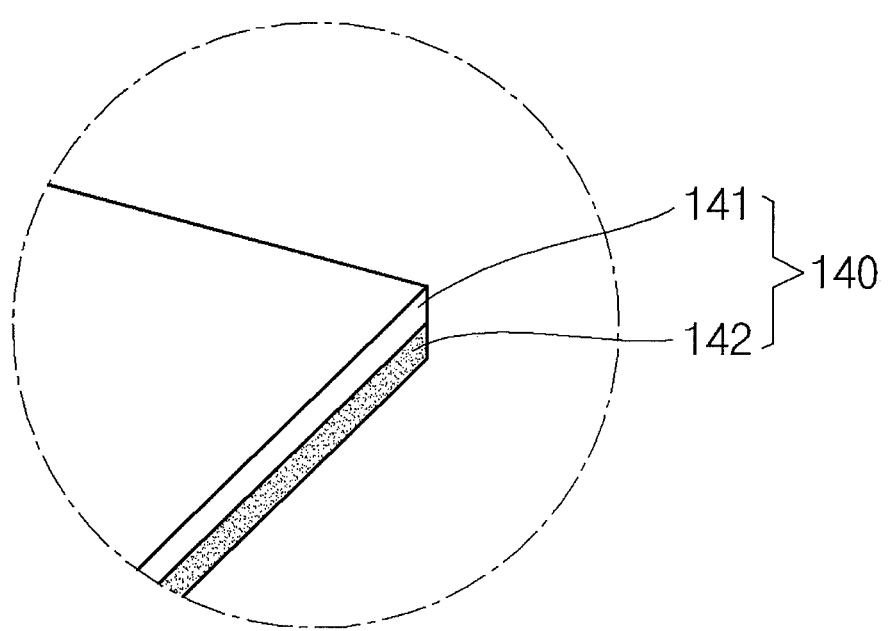
FIG. 4 is an enlarged view illustrating a region 4 of FIG. 2.

FIG. 1 is a circuit diagram illustrating a battery pack according to an embodiment. FIG. 2 is a perspective view illustrating a state where a first bank of FIG. 1 is connected to a conductive plate. FIG. 3 is a plan view illustrating an insulating tape of FIG. 2. FIG. 4 is an enlarged view illustrating a region 4 of FIG. 2.

With reference to FIGS. 1, 2, and 4, a battery pack 100 according to the current embodiment includes a plurality of battery cells 110, a first connecting plate 120, a second connecting plate 130, an insulating member 140, a connecting member 150, a protection circuit module 160, and a case 170.

Each of the battery cells 110 may include: an electrode assembly (not shown); a can accommodating the electrode assembly; and a cap assembly (not shown) coupled to a coupling hole of the can accommodating the electrode assembly. The top and bottom surfaces of a bare cell may have different poles, as a positive terminal and a negative terminal. The battery cells 110 may be connected to each other in series, in parallel, or in series/parallel through at least one first connecting plate 120. For example, in one embodiment, the battery cells 110 constitute banks 113, 114, and 115 that are electrically connected to each other in series. Each of the banks 113, 114, and 115 includes three of the battery cells 110, and the three battery cells 110 are electrically connected to each other in parallel. Although each of the banks 113, 114, and 115 includes the three battery cells 110, it may be understood that the number of banks and the number of the battery cells 110 are not limited thereto and that embodiments of the battery cells 110 may include different numbers of banks and battery cells 110.

The first connecting plate 120 connects N ones of the plurality of battery cells 110 to each other. The first connecting plate 120 has a planar plate shape and includes cell attachment parts 121, 122, and 123 that are attached to the battery cells 110. The cell attachment parts 121, 122, and 123 are provided in the form of a through hole. The cell attachment parts 121, 122, and 123 are used to weld the first connecting plate 120 to the battery cells 110. Welding holes 124, 125, and 126 are disposed around the cell attachment parts 121, 122, and 123 to reduce welding resistance and concentrate electric current, thereby improving welding quality.

The first connecting plate 120 may be formed of a metal. For example, the metal may be nickel, but is not limited thereto.

The second connecting plate 130 includes a connecting part 131, a bent part 132, an extension part 133, and an attachment part 134. The second connecting plate 130 is connected to the first connecting plate 120.

In an embodiment, the second connecting plate 130 may have a planar plate shape. The second connecting plate 130 is bent at the bent part 132 which divides the second connecting plate between the connecting part 131 and the extension part 133, so as to form an L shape. The connecting plate 131 is fixed to a portion of the first connecting plate 120, and is electrically connected thereto.

The extension part 133 is disposed between neighboring ones of the battery cells 110. The extension part 133 includes the attachment part 134. The connecting member 150 to be described later is attached to the attachment part 134.

The second connecting plate 130 includes a plurality of conductive patterns (not shown) and an insulating layer (see, e.g., region 4 of FIG. 2 and insulating member 140 of FIG. 4) enveloping the conductive patterns. The connecting member 150 may include a flexible printed circuit board (FPCB) or a coverlay. In this case, the attachment part 134 may be a region formed by removing a portion of the insulating layer to expose a conductive pattern. Although the second connecting plate 130 is illustrated as being connected to the first connecting plate 120 in FIG. 2, in alternative embodiments, the second connecting plate 130 and the first connecting plate 120 may be integrally formed as a single body.

With further reference to FIG. 4, the insulating member 140 includes an insulating layer 141 and an adhesive layer 142. The insulating member 140 may be an insulating tape. The insulating member 140 is disposed between the second connecting plate 130 and the space formed between neighboring ones of the battery cells 110. The insulating member 140 protects the battery cells 110 from heat generated when an end of the connecting member 150 is soldered to the attachment part 134. The second connecting plate 130 may be connected to a first terminal of the battery cell 110 and electrically insulated by the insulating member 140 from a side surface of the battery cell 110 which functions as a second terminal of the battery cell 110.

With reference to FIG. 3, the insulating member 140 includes: a first region 143 placed between neighboring ones of the battery cells 110. The insulating member 140 further includes a plurality of second regions 144 and 145 that are bent from the first region 143 (e.g., away from and out of the plane of the first region 143 and are placed on or adjacent to the outer surfaces of the neighboring battery cells 110, respectively. The extension part 133 of the second connecting plate 130 is placed on the first region 143. The insulating member 140 may be bent along horizontal and vertical lines 147 (e.g., 147a, 147b, 147c, 147d). The horizontal and vertical lines 147 are guide lines for facilitating the bending of the insulating member 140.

The first and second regions 143, 144, and 145 are bent along first lines 147a and 147b. A plurality of recesses are arrayed in the first lines 147a and 147b. In this case, the recesses may be notches or through holes.

The second regions 144 and 145 include: a plurality of cell attachment regions 144a and 145a attached to the surfaces of the neighboring battery cells 110, respectively; and a plurality of plate fixing regions 144b and 145b extending along the cell attachment regions 144a and 145a. The cell attachment regions 144a and 145a, and the first region 143, may have approximately the same area. The second regions 144 and 145 may be longer than the first region 143, so as to form a third region 146 (e.g., a void space) that is out of the insulating member 140 between the second regions 144 and 145.

The cell attachment regions 144a and 145a and the plate fixing regions 144b and 145b are bent along second lines 147c and 147d, approximately perpendicular to the first lines 147a and 147b. The second lines 147c and 147d may be aligned along the length of the second regions 144 and 145 with an end of the first region 143.

After the first and second connecting plates 120 and 130 are connected to the battery cells 110, the plate fixing regions 144b and 145b are attached to a portion (e.g., an upper portion) of the first connecting plate 120 and the connecting part 131 of the second connecting plate and 130. The plate fixing regions 144b and 145b are attached to the upper portion of the bent second connecting plate 130 to prevent the spring back of the second connecting plate 130, thereby reducing contact failure between the battery cells 110 and the first and second connecting plates 120 and 130.

A plurality of recesses are arrayed in the second lines 147c and 147d. In this case, the recesses may be notches or through holes. The second lines 147c and 147d include cut lines 148 and 149. The cut lines 148 and 149 are formed by cutting a portion of the second lines 147c and 147d from an end of the first region 143 to the inner portion of the second regions 144 and 145. The cut lines 148 and 149 are formed by cutting the second lines 147c and 147d according to the width of the second connecting plate 130.

The connecting member 150 is connected to the attachment part 134 of the second connecting plate 130, e.g., through soldering. The connecting member 150 may include: a conductive wire through which electric current flows; and an insulating sheathe for sheathing the wire. In this case, both ends of the wire are exposed.

The connecting member 150 electrically connects the second connecting plate 130 to the protection circuit module 160 to be described later. The connecting member 150 may be a power wire or a voltage sensing wire.

The protection circuit module 160 may include protection circuit modules as known in the art. For example, the protection circuit module 160 may include: an insulating board formed of a glass fiber reinforced epoxy resin; and an electronic device mounted on a surface of the insulating board to form a protection circuit. The protection circuit module 160 may be accommodated in the case 170, or be attached to an outer portion of the case 170. In the current embodiment, the protection circuit module 160 is accommodated in the case 170.

An opening may be formed in a side portion of the case 170, and a cover case may cover the opening. The case 170 may include a terminal hole for exposing a positive terminal and a negative terminal.

According to the current embodiment, an insulating tape is removed before the first and second connecting plates 120 and 130 are connected to the battery cells 110, and thus, a process lead time can be decreased.

In addition, after the first and second connecting plates 120 and 130 are connected to the battery cells 110, the insulating member 140 is attached so as to prevent the spring back of the second connecting plate 130, thereby reducing contact failure between the battery cells 110 and the first and second connecting plates 120 and 130. When the insulating member 140 is inappropriately attached, the insulating member 140 can be removed and attached again, thereby saving costs.

A battery pack according to an embodiment makes it possible to decrease a lead time of an insulating tape attaching process, and re-attach an insulating member.

In addition, a first connecting plate and a second connecting plate are prevented from being raised up by spring back, thereby preventing contact failure thereof.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack comprising:
    a plurality of battery cells having a first and second ends and side surfaces interposed there between wherein terminals formed on the first ends of the plurality of batteries;
    a protection circuit module that controls charging and discharging of the battery cells;
    a first connecting plate extending over the first ends of the batteries and electrically connecting the battery cells to each other;
    a second connecting plate extending over the side surfaces of the batteries and electrically connected to the first connecting plate, and bent from the first connecting plate; and
    an insulating member disposed between the battery cell and the first and the second connecting plates,
    wherein the insulating member comprises: a planar first region placed between neighboring ones of the battery cells and between the second connecting plate and the batteries; and a plurality of second regions comprising: a plurality of cell attachment regions that are bent away from and out of the plane of the first planar region and are respectively attached to the surfaces of the neighboring battery cells; and a plurality of plate fixing regions that are respectively extended along the cell attachment regions, and are respectively placed on cell attachment parts where are the first connecting plate are attached to the battery cells, such that the insulating member is bent along horizontal and vertical lines.

2. The battery pack as claimed in claim 1, wherein the first and second regions are bent along first lines, and a plurality of recesses or notches are arrayed in the first line.

3. The battery pack as claimed in claim 1, wherein the insulating member comprises a plate fixing region extending along the second region.

4. The battery pack as claimed in claim 3, wherein the second region comprises a plurality of recesses or notches arrayed along a second line formed in the plate fixing region.

5. The battery pack as claimed in claim 4, wherein the second line extends along an end of the first region.

6. The battery pack as claimed in claim 4, wherein the second line comprises a cut line formed by cutting a portion of the second line from an end of the first region to an inner portion of the second region.

7. The battery pack as claimed in claim 3, wherein the plate fixing region is placed on at least one portion of the first and second connecting plates.

8. The battery pack as claimed in claim 1, wherein the insulating member comprises an adhesive layer on a surface thereof.

9. The battery pack as claimed in claim 1, wherein the second connecting plate comprises:
    a connecting part electrically connected to the first connecting plate;
    a bent part perpendicularly bent from the connecting part; and
    an extension part extending from the bent part.

10. The battery pack as claimed in claim 1, wherein the second connecting plate comprises a flexible printed circuit board (FPCB) that comprises a plurality of conductive patterns and an insulating layer enveloping the conductive patterns.

11. The battery pack as claimed in claim 10, wherein the second connecting plate comprises an attachment part formed by removing a portion of the insulating layer, and a connecting member is fixed to the attachment part through welding.

12. The battery pack as claimed in claim 11, wherein the connecting member is electrically connected to the protection circuit module.

13. The battery pack as claimed in claim 1, wherein the first connecting plate and the second connecting plate are integrally formed as a single body.

14. The battery pack as claimed in claim 1, wherein the insulating member comprises a plurality of through holes arrayed along a first line between the first region and the second region.

15. A battery pack, comprising:
   a plurality of battery cells having a first end and second end with side walls interposed there between wherein terminals formed on the first ends of the plurality of batteries;
   first electrically conductive element in contact with the terminals of the plurality of battery cells;
   a second electrically conductive element;
   an insulating member having a first region and a second region, wherein the first region is planar and is interposed between the second electrically conductive element and the side walls of two adjacent battery cells and wherein the second region comprising: a plurality of cell attachment regions that are bent away from and out of the plane of the first region and are respectively attached to the surfaces of the neighboring battery cells; and a plurality of plate fixing regions that are respectively extended along the cell attachment regions, and are placed on cell attachment parts where are the first connecting plate are respectively attached to the battery cells, such that the insulating member is bent along horizontal and vertical lines.

16. The battery pack of claim 15, further comprising a protection circuit module that controls charging and discharging of the battery cells.

17. The battery pack of claim 15, wherein the plurality of battery cells are cylindrical.

18. The battery pack of claim 17, wherein the first side of a battery cell is a sidewall of the cylinder and wherein the second side of a battery cell is an end of the cylinder.

19. The battery pack of claim 15, wherein the insulating member comprises an insulating layer and an adhesive layer.

20. The battery pack of claim 15, further comprising a connecting member having an end connected to the electrically conductive element, the connection member selected from flexible printed circuit boards.

* * * * *